US012181122B2

(12) United States Patent
Hohmann et al.

(10) Patent No.: US 12,181,122 B2
(45) Date of Patent: Dec. 31, 2024

(54) HOLOGRAPHIC LIGHTING DEVICE

(71) Applicant: HELLA GmbH & Co. KGaA, Lippstadt (DE)

(72) Inventors: Carsten Hohmann, Warstein (DE); Martin Muegge, Geseke (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 18/537,069

(22) Filed: Dec. 12, 2023

(65) Prior Publication Data
US 2024/0191861 A1 Jun. 13, 2024

(30) Foreign Application Priority Data
Dec. 12, 2022 (DE) ...................... 10 2022 132 914.3

(51) Int. Cl.
*F21S 43/14* (2018.01)
*B60Q 1/30* (2006.01)
*B60Q 1/44* (2006.01)
*B60Q 1/50* (2006.01)
*G02B 5/32* (2006.01)

(52) U.S. Cl.
CPC ................ *F21S 43/14* (2018.01); *B60Q 1/30* (2013.01); *B60Q 1/44* (2013.01); *B60Q 1/503* (2013.01); *G02B 5/32* (2013.01)

(58) Field of Classification Search
CPC .. F21S 43/14; B60Q 1/30; B60Q 1/44; B60Q 1/503; G02B 5/32
See application file for complete search history.

(56) References Cited

U.S. PATENT DOCUMENTS

| 10,642,035 | B2 | 5/2020 | Zhao et al. | |
| 10,683,984 | B2 | 6/2020 | Mügge | |
| 2002/0027678 | A1* | 3/2002 | Halldorsson | G02B 27/0103 359/15 |
| 2005/0068596 | A1* | 3/2005 | Claudelli | G03H 1/0486 359/25 |
| 2006/0132914 | A1* | 6/2006 | Weiss | G02B 30/40 359/462 |

(Continued)

FOREIGN PATENT DOCUMENTS

| DE | 102016111119 A1 | 12/2017 |
| DE | 102016117685 A1 | 3/2018 |
| DE | 102018116670 A1 | 1/2020 |

*Primary Examiner* — Christopher E Dunay
(74) *Attorney, Agent, or Firm* — Muncy, Geissler, Olds & Lowe, P.C.

(57) ABSTRACT

A holographic lighting device for vehicles with a light source for emitting light and with an optical unit containing a hologram element which is set up in such a way that a hologram image is generated in a given field of view. In the hologram element, such hologram information is inserted that by changing a viewing angle from a center position of the viewer, in which the viewer is arranged vertically to a surface of the hologram element, in the direction of a lateral boundary position of the viewer in which a boundary of the field of view is reached, at least in some areas, a distance between the generated hologram image and the hologram image in the center position is increased or is rotated by a vertical and/or horizontal axis, and/or a brightness of the hologram image is reduced.

15 Claims, 4 Drawing Sheets

(56) References Cited

U.S. PATENT DOCUMENTS

| | | | |
|---|---|---|---|
| 2008/0062846 A1* | 3/2008 | Usami | G03H 1/2249 369/103 |
| 2010/0103485 A1* | 4/2010 | Haussler | G03H 1/02 359/9 |
| 2011/0267666 A1* | 11/2011 | Redmond | G03H 1/2286 359/32 |
| 2014/0295970 A1 | 10/2014 | Gronkowski et al. | |

* cited by examiner

HOLOGRAPHIC LIGHTING DEVICE

This nonprovisional application claims priority under 35 U.S.C. § 119(a) to German Patent Application No. 10 2022 132 914.3, which was filed in Germany on Dec. 12, 2022, and which is herein incorporated by reference.

BACKGROUND OF THE INVENTION

Field of the Invention

The present invention relates to a holographic lighting device for vehicles with a light source for emitting light and with an optical unit containing a hologram element set up to produce a hologram image in a given field of view.

Description of the Background Art

From DE 10 2016 117 685 A1, which corresponds to US 2019/0264888, which is incorporated herein by reference, a holographic lighting device with a light source and an optical unit containing a reflector and a hologram element is known. The well-known holographic lighting device allows for the viewing angle range for the hologram element to be widened.

From DE 10 2018 116 670 A1, a holographic lighting device with a light source and an optical unit containing a hologram element is known, wherein the light source also has a filter. This is advantageous to create a hologram image that has an increased depth of field.

The well-known holographic lighting devices enable the generation of a three-dimensional light signature for a signaling function of a vehicle. If, for example, the three-dimensional light signature is a logo, i.e., a sign to identify a vehicle, for example a sign to identify a vehicle manufacturer, this logo is only fully recognizable to a viewer in a specified field of view (eyebox). As can be seen from FIG. 1, when viewed from the side, the logo appears to be cut off at the boundary of the field of view and therefore not complete.

SUMMARY OF THE INVENTION

It is therefore an object of the present invention to provide a holographic lighting device such that section effects of a generated hologram image are avoided when viewed from the side at a boundary of a field of view and instead the hologram image is perceived as a homogeneous hologram image by the viewer.

In order to achieve this object, the invention is characterized in that such hologram information can be inserted into the hologram element that, by changing a viewing angle from a center position of the viewer, in which the viewer is arranged vertically to a surface of the hologram element, towards a lateral boundary position of the viewer in which a limit of the field of view is reached, at least in some areas, a distance between the generated hologram image and the hologram image in the center position is increased or rotated by a vertical and/or horizontal axis and/or the brightness of the hologram image is reduced.

According to the invention, such information can be inserted into a hologram element that when a viewing angle is changed in the direction of a boundary of a field of view of the hologram element or a hologram image generated by the hologram element, the generated hologram image is linearly shifted or rotated on the one hand and/or its brightness is reduced on the other. In this way, a defined process of disappearance of the generated hologram image can be achieved advantageously when the viewing angle approaches a boundary position in which the viewer is at a limit of the field of view. Advantageously, peripheral areas of the hologram image are continuously faded out, so that the change of the hologram image is considered intentional for the viewer who is at a boundary of the field of view.

Such information can be inserted into the hologram element so that by changing the viewing angle from a center position of the viewer in the field of view to a boundary position of the field of view, the hologram image is gradually or continuously brought to a greater distance from the viewer. This intentionally creates a blurring effect that can be used to fade out part of the hologram image at the boundary of the viewing angle range.

Such information can be inserted into the hologram element so that there is a proportional relationship between the change in the viewing angle and a distance of the hologram image from a central hologram image at a viewing angle of 0° in the center position of the viewer. This is advantageous in enabling homogeneous fade-out.

The hologram element can be provided with such information that the change in the distance of the hologram image to the hologram image is disproportionately increased in the center position of the field of view. In this way, the fading only takes place in the area of a boundary of the field of view.

The change in distance between the hologram image and the hologram image in the center position of the viewer only occurs from an intermediate position, in which the viewing angle is, for example, 25° relative to the center position. This is advantageous for providing a sharp hologram image in an area between the center position and the intermediate position.

Preferably, the distance change and/or brightness reduction from the center position of the viewer to the boundary position of the viewer can be carried out in the horizontal direction since this is the most common direction of movement of the viewer relative to the vehicle or lighting device in the case of a vehicle lighting device.

The set distance of the hologram image, which is assigned to a certain viewing angle, can depend on a thickness of the hologram element (volume hologram element) and/or exposure parameters during the manufacture of the hologram element. If necessary, a blur effect can be used, which increases with increasing distance from a holographic zero level in which the hologram image is centered on the viewing angle.

Information can be inserted into the hologram element, which causes the hologram image to be rotated when the viewer is at least partially moved from the center position to the boundary position. Preferably, the size of the hologram image can be reduced in the direction of the boundary position, so that the entire hologram image is always recognizable.

Information can be inserted into the hologram element which causes the brightness to decrease proportionally or disproportionately when the viewing angle is changed from the center position to the boundary position, at least in some areas, so that a desired fading out of the entire hologram image occurs when approaching the boundary position of the field of view.

The hologram element can contain such information that both the brightness and an increase in distance are achieved with at least a partial change of the viewing angle from the center position to the boundary position. This can further increase the fade-out effect.

The light guide element can be designed as a lens and/or as a light guide and/or as a reflector, so that the hologram image generated is independent of the holographic production of the hologram element.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

A holographic lighting device 1 can be integrated into a rear area of a vehicle. For example, the holographic lighting device 1 can create a tail light and/or brake light function together with other lighting devices that are not shown. For example, the holographic lighting device 1 may be located in a central area of the rear of the vehicle as part of a rear light housing and may represent a logo of the vehicle manufacturer. Alternatively, the holographic lighting device 1 can also be located in a separate housing within the rear area, such as a tailgate of the vehicle. Preferably, the holographic lighting device 1 emits light of red color, so that it serves together with another illumination device to produce a tail light function. Alternatively, the holographic lighting device 1 can also be located in a front area of the vehicle, where it serves together with another lighting device to generate a position or daytime running light. It is understood that in this application, the holographic lighting device 1 illuminates the logo or symbol of the vehicle manufacturer in white.

Figure 5:
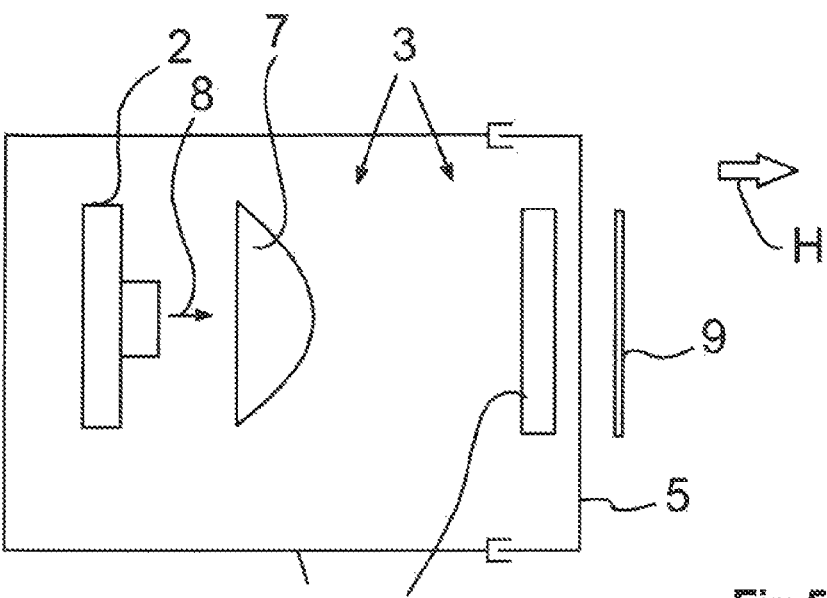
FIG. 5 is a schematic representation of the holographic lighting device.

As can be seen from FIG. 5, the holographic lighting device 1 has a light source 2 and an optical unit 3, which includes a hologram element 4. The hologram element 4 is arranged in the area of a cover glass 5, which covers the opening of a housing 6 of the holographic lighting device 1. For example, the hologram element 4 may be part of the cover glass 5 or, as shown in FIG. 5, it may be located in the main beam direction H of the lighting device 1 behind the cover glass 5. If the light source 2 of the holographic lighting device 1 is switched on, a hologram image 9 is generated by means of the hologram element 4, which can be arranged in the main beam direction H, for example, offset from the hologram element 4. This hologram image 9 is a logo with the name "FORVIA" in the present example.

Optionally, the optical unit 3 can have a light guide element 7, such as a light guide or a reflector or a lens, by means of which a light 8 emitted by the light source is guided in the direction of the hologram element 4. The light guide element 7 is located between the light source 2 and the hologram element 4.

The light source 2 can be designed as an LED light source, which emits the light 8 in a predetermined light color.

The hologram element 4 is preferably designed as a volume hologram element. The hologram element 4 preferably has a photopolymer layer. By means of well-known methods, a hologram is exposed into a light-sensitive recording material. Individual sections of the hologram element 4 are successively exposed to an object beam and a reference beam. The object beam is modulated by a light modulator with computer-generated hologram information. According to the invention, this hologram information or this holographic information is formed in such a way that the hologram image 9, when a viewing angle q is changed, increases from a center position according to FIG. 3a in the direction of a boundary position according to FIG. 3d with respect to a distance a to a holographic zero level 10, in which the hologram image 9 is located in the center position according to FIG. 3a, and/or a brightness of the hologram image 9 is reduced.

According to an example of the invention according to FIGS. 3a to 3d, such hologram information is inserted into the hologram element 4, by changing the viewing angle φ in the horizontal direction from an intermediate position in which the viewing angle is 25° to a boundary angle $\varphi_G$ in which the viewing angle φ is in the range of 70° to 80°, the distance a increases. According to a first variant of the invention, the distance a can increase proportionally to the viewing angle φ, see dashed line 11 in FIG. 4.

Figure 4:
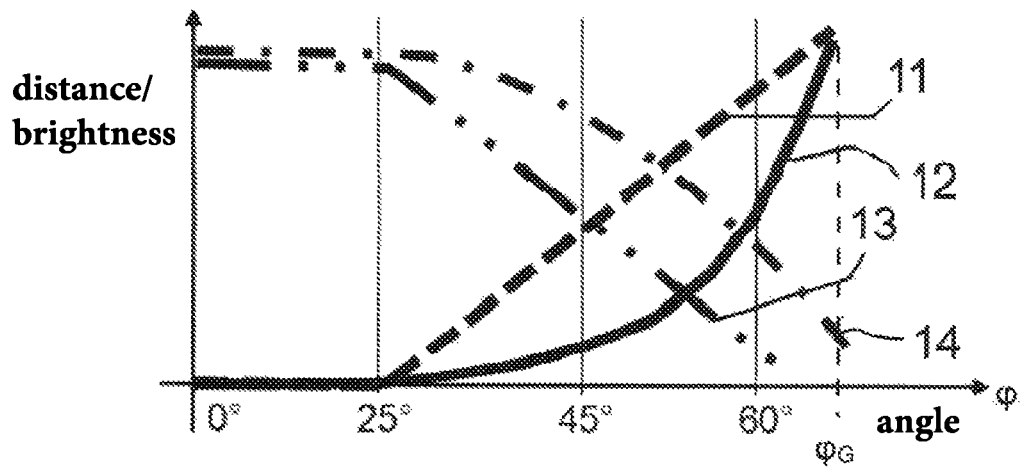
FIG. 4 is a distance curve/brightness curve depending on the viewing angle.

Further, the distance a of the hologram images 9 can increase disproportionately according to line 12, as can be seen from the solid line in FIG. 4.

At the viewing angle of φ equal to 0°, the hologram image 9 is in the holographic zero level 10. Until the horizontal viewing angle φ of 25° according to FIG. 3b is reached, the absolute position of the hologram image 9 does not change. It remains unchanged in the same position. A change in the absolute position of the hologram image 9 only occurs in a range between the viewing angle φ equal to 25° (intermediate position) and a viewing angle $\varphi_G$ at the end of the field of view 16 (boundary position). For example, a hologram image 9' from the viewing angle φ of 25° has a distance a1 to the hologram image 9 in the center position according to FIG. 3a. In FIGS. 3b, 3c, 3d, the hologram images 9 are shown in the center position only to illustrate the distance a. In fact, this hologram image 9 is not generated.

If the viewing angle φ increases, the distance a of the currently displayed hologram image 9 also increases according to the characteristic curve 12. For example, a hologram image 9" has a distance a2 at a viewing angle φ of 45° and a hologram image 9''' has a distance a3 from the hologram image 9 in the center position at the viewing angle φ equal to 60°.

If the viewing angle $\varphi_G$ is reached in the boundary position of the field of view 16, the hologram image 9 is shifted in a maximum depth position.

It can be seen that the hologram images 9', 9", 9''' are arranged parallel offset to an extension plane E of the hologram image 9. Thus, for all parts of the hologram image 9, for example for all letters of the logo 9, the same depth offset a1, a2, a3 occurs. Due to the increase in depth offset according to the invention, not only does the hologram image 9 fade out for the viewer B, but also the viewer B becomes more attentive due to the movement of the hologram image 9 between the intermediate position according to FIG. 3b and the final position.

Figure 1:
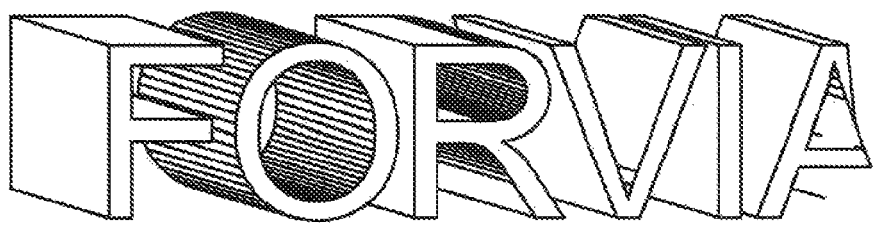
FIG. 1 is a representation of a hologram image with a truncated end, wherein the hologram image is viewed at a boundary of the field of view according to the conventional art.
Figure 2:
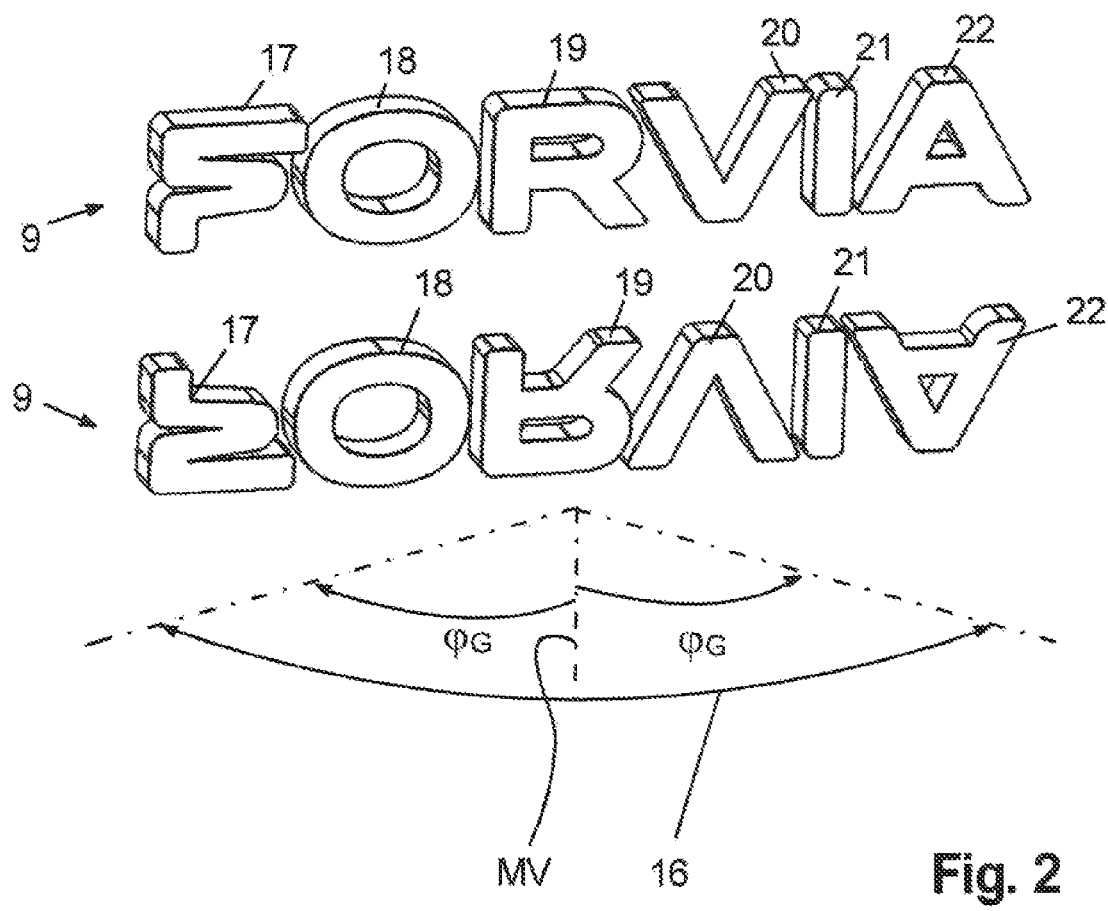
FIG. 2 is an exemplary representation of a hologram image in a frontal view.
Figure 3A:
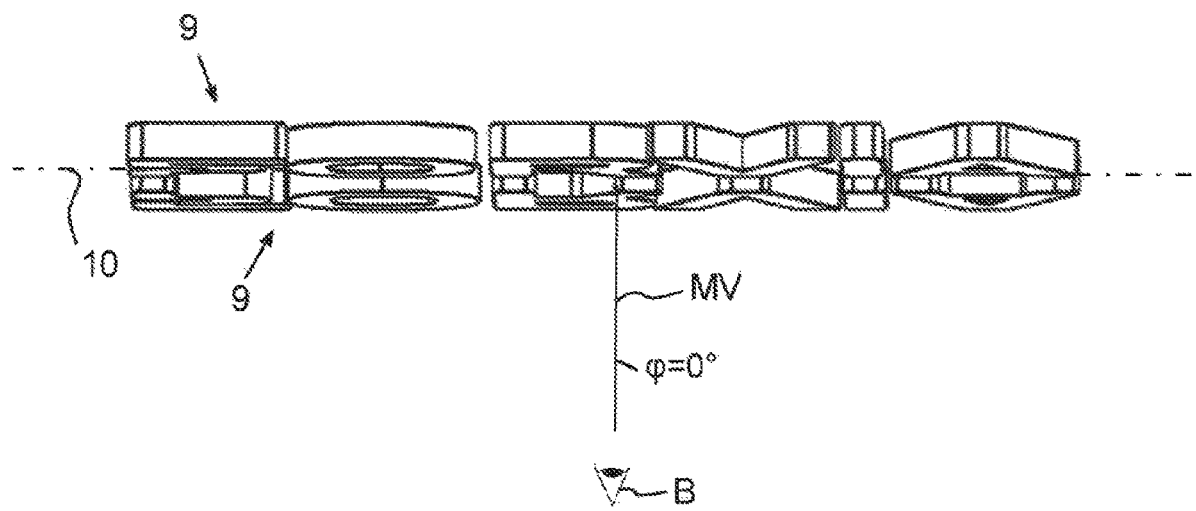
FIG. 3a is a representation of the hologram image from above in a center position of the viewer where the viewing angle is 0°.
Figure 3B:
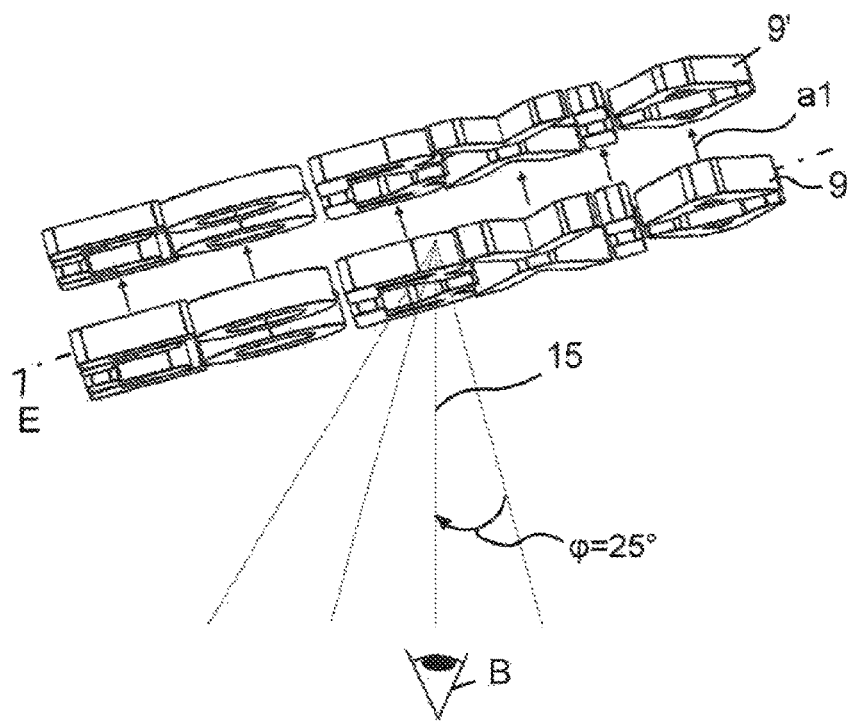
FIG. 3b is a representation of the hologram image when the viewing angle is changed in the horizontal direction, with the viewer in an intermediate position in which the viewing angle is 25°.
Figure 3C:
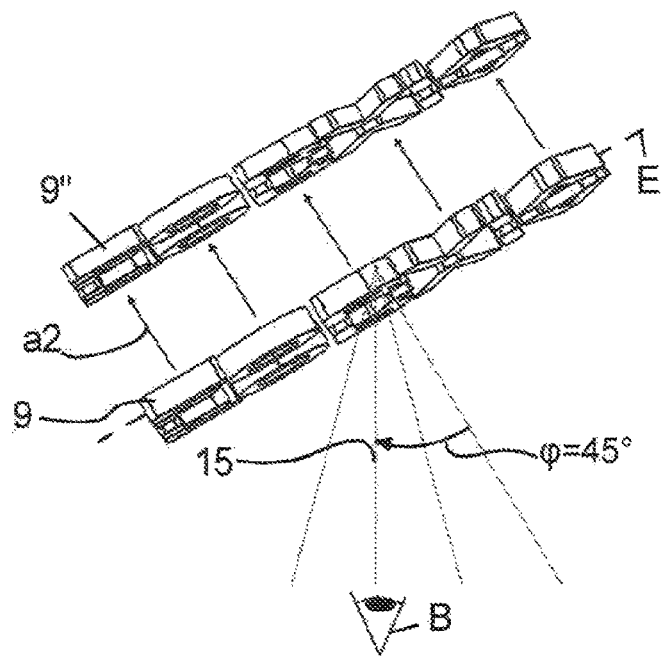
FIG. 3c is a representation of the hologram image when the viewing angle is changed in the horizontal direction, with the viewer in a position where the viewing angle is 45°.
Figure 3D:
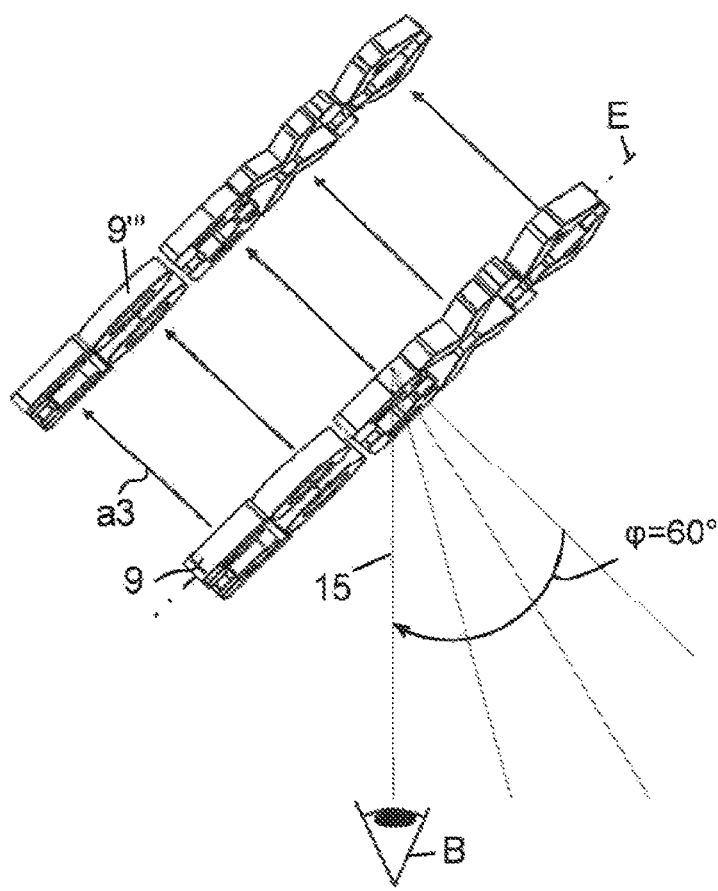
FIG. 3d is a representation of the hologram image when the viewing angle is changed in the horizontal direction, with the viewer in a position where the viewing angle is 60°.

According to an example, in addition or alternatively, such hologram information may be inserted into the hologram element 4 that when the viewing angle q is changed from the center position according to FIG. 3a to the boundary position of the field of view 16, in which the viewing angle is $\varphi_G$, the brightness of the hologram image 9 is reduced at least in some areas. As can be seen from FIG. 4, the brightness can be reduced proportionally from the intermediate position of the field of view 16, in which the viewing angle φ is 25°, according to the characteristic curve 13 up to the boundary position. Alternatively, the brightness can also be reduced disproportionately according to characteristic curve 14 in FIG. 4. As the lateral viewing angle φ increases, the brightness is reduced until it is less than 5% of the brightness of the hologram image 9 in the center position or zero at the latest in the boundary position when the viewing limit angle $\varphi_G$ of 80° or 85° is reached, for example, so that the hologram image 9 cannot be recognized.

The brightness of the hologram image 9 in the boundary position of the field of view 16 can be less than 20% of the brightness of the hologram image (9) in the center position.

The hologram image 9 is recognizable in an area (field of view 16) from φ equal to 0° to 85°, starting from a vertical center plane MV of the hologram image 9 in a horizontal direction to the right and left.

Further, the hologram element 4 contains such hologram information that when the viewing angle φ is changed in the direction of the boundary position of the viewer B, the hologram image 9 is rotated, at least from an intermediate position with a viewing angle φ of 25°. Preferably, the hologram image 9 rotates in the horizontal direction with a lateral change of the viewing angle φ, so that the hologram images 9', 9", 9''' are always oriented perpendicular to a viewing direction 15 of the viewer B. In the example described above, the angle of the hologram images 9', 9", 9''' to the hologram element 4 is always the same, so that the viewing direction 15 coincides with the viewing angle q.

Preferably, hologram information can be inserted into the hologram element 4 in such a way that the rotation of the hologram image 9 is accompanied by a reduction in its size, so that a complete reproducibility in the holographic surface is guaranteed.

The rotation of the hologram image can be combined with the reduction of brightness, so that the fade-out effect or the vanishing effect is magnified.

The hologram image 9 can also be tilted horizontally around a horizontal axis with an increase in the lateral viewing angle φ. In this case, a vertical tilt or rotation occurs instead of a horizontal rotation (rotation in the horizontal direction). This can also be combined with a brightness reduction.

The light source 2 can be designed as an LED light source that emits white or colored light. The light guide element 7 can be designed as a light guide or as a reflector or as a lens.

In the example of the invention described, the hologram images 9', 9", 9''' are shifted by the distances a1, a2, a3 opposite to the main beam direction H. According to a further example, the hologram images 9', 9", 9''' can also be moved in the main beam direction H.

The maximum distance of the hologram image to the hologram image 9 in the center position may be in the range of 60 mm or 120 mm, so that the distance a between the hologram image 9 in the center position and the hologram image 9 in the unrepresented boundary position can amount to 0 mm to 120 mm, preferably 0 mm to 90 mm or 0 mm to 60 mm.

The entire hologram image 9 may not be generated by a single hologram element 4. Instead, hologram image segments 17, 18, 19, 20, 21, 22, which in the present example represent individual letters, can be generated independently of each other by different hologram elements 4. The hologram elements 4 can be assigned separate light sources so that a higher luminance can be generated.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A holographic lighting device for vehicles, the holographic lighting device comprising:
    a light source to emit light; and
    an optical unit having a hologram element that is configured such that a hologram image is generated in a given field of view, the hologram element being configured by exposing the hologram element to a reference beam and an object beam that is modulated by a light modulator with computer-generated hologram information, such that when a viewer is oriented along a center plane that extends perpendicular to a surface of the hologram element, the hologram image is generated in a hologram center position and with a change of a viewing angle of the viewer from the center plane in the direction of a lateral boundary position of the viewer in which a limit of the field of view is reached, at least in some areas, the hologram image is generated at a distance from the hologram center position with the distance increasing as the viewing angle increases or the hologram image is rotated by a vertical and/or horizontal axis.

2. The holographic lighting device according to claim 1, wherein the computer-generated hologram information is inserted in the hologram element such that, as the viewing angle increases in the direction of the lateral boundary position of the field of view, the distance is increased in a direction away from the viewer such that the hologram image is generated farther away from the viewer as the viewing angle increases.

3. The holographic lighting device according to claim 1, wherein the computer-generated hologram information is inserted in the hologram element such that with a change in the viewing angle in at least one area between the center plane in the direction of the lateral boundary position of the field of view, the distance increases proportionally.

4. The holographic lighting device according to claim 1, wherein the computer-generated hologram information is inserted in the hologram element such that with a change in the viewing angle in at least one area between the center plane in the direction of the lateral boundary position of the field of view, the distance increases disproportionately.

5. The holographic lighting device according to claim 1, wherein the computer-generated hologram information is inserted in the hologram element such that when the viewing angle is changed horizontally from an intermediate position of the viewer in the field of view in the direction of the lateral boundary position of the field of view, the hologram image is shifted by the distance and such that if the viewing angle is changed to an angle between the center plane and the intermediate position of the viewer, the hologram image is not shifted.

6. The holographic lighting device according to claim 1, wherein a maximum change in the distance depends on a thickness of the hologram element and/or on exposure parameters during the manufacture of the hologram element.

7. The holographic lighting device according to claim 1, wherein the computer-generated hologram information is inserted in the hologram element such that the distance from the hologram center position at which the hologram image is generatable is in a range of 0 mm to 120 mm.

8. The holographic lighting device according to claim 1, wherein the hologram image is generated to have such a reduced size with an increasing angle of rotation that the hologram image is mapped in a surface of the hologram element.

9. The holographic lighting device according to claim 1, wherein the computer-generated hologram information is inserted in the hologram element, such that when the viewing angle is changed horizontally from the center plane of the field of view to the lateral boundary position of the field of view, the hologram image is rotated in a vertical direction from an intermediate position.

10. The holographic lighting device according to claim 1, wherein a brightness of the hologram image is reduced proportionally or disproportionately, at least in some areas, with increasing distance from the hologram center position.

11. The holographic lighting device according to claim 1, wherein a brightness of the hologram image, in the lateral boundary position of the viewer, is less than 20% of the brightness of the hologram image in the hologram center position.

12. The holographic lighting device according to claim 1, wherein the hologram image comprises several independently generated hologram image segments, and wherein all of the hologram image segments are shifted by the distance.

13. The holographic lighting device according to claim 1, wherein the light source is an LED light source.

14. The holographic lighting device according to claim 1, wherein the hologram image is a graphic sign or is a logo.

15. The holographic lighting device according to claim 1, wherein the optical unit includes a light guide element, and wherein the light guide element is a lens and/or a light guide and/or a reflector.

* * * * *